(12) United States Patent
Ra et al.

(10) Patent No.: US 7,729,562 B2
(45) Date of Patent: Jun. 1, 2010

(54) METHOD OF DETECTING ALIGNMENT ERROR OF LENSES AND COMPENSATING FOR IMAGE DISTORTION IN 3D LENTICULAR DISPLAY

(75) Inventors: Jong-Beom Ra, Daejon (KR); Yun-Gu Lee, Gyeonggi-Do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1169 days.

(21) Appl. No.: 11/332,879

(22) Filed: Jan. 13, 2006

(65) Prior Publication Data
US 2006/0245063 A1 Nov. 2, 2006

(30) Foreign Application Priority Data
Apr. 29, 2005 (KR) .................. 10-2005-0035832

(51) Int. Cl.
G06K 9/32 (2006.01)
G02B 27/10 (2006.01)
(52) U.S. Cl. .................................... 382/294; 359/619
(58) Field of Classification Search ......... 382/274–276, 382/294, 312; 359/403, 619; 348/59, 42; 349/61; 375/240.01
See application file for complete search history.

(56) References Cited

U.S. PATENT DOCUMENTS 6,795,241 B1 * 9/2004 Holzbach .................... 359/463
6,801,243 B1 * 10/2004 Van Berkel .................. 348/59
6,882,381 B2 * 4/2005 Sumida et al. ................ 349/61
7,110,103 B2 * 9/2006 Montgomery et al. ..... 356/152.1
2002/0114078 A1 * 8/2002 Halle et al. .................. 359/619
2005/0185711 A1 * 8/2005 Pfister et al. ........... 375/240.01

OTHER PUBLICATIONS

"Reduction of the distortion due to non-ideal lens alignment in lenticular 3D displays", Yun-Gu Lee and Jong Beom Ra, Electronic Imaging 2005, Jan. 16-20, 2005, San Jose, CA, vols. 5665-5685.

* cited by examiner

Primary Examiner—Kanji Patel
(74) Attorney, Agent, or Firm—Harness, Dickey & Pierce, PLC (57) ABSTRACT

A method of detecting the alignment error of lenses and reducing image distortion attributable to the alignment error in a lens-type 3-dimensional liquid crystal display monitor. A method of detecting the alignment error of lenses in a 3D display using a purpose-built test pattern image, which predicts the alignment error in such a way as to calculate variation in view indices of pixels in a lateral direction, observed by an eye of an observer, if there is alignment error in the lenses. A method of compensating for image distortion in a 3D monitor, including the steps of finding the relationship between the pixels of a Liquid Crystal Display (LDC) panel and the pixels of observed images, which are determined depending on the location of an observer; and compensating for image distortion attributable to the rotational and translational alignment error of the lenses based on the found relationship.

5 Claims, 8 Drawing Sheets

METHOD OF DETECTING ALIGNMENT ERROR OF LENSES AND COMPENSATING FOR IMAGE DISTORTION IN 3D LENTICULAR DISPLAY

BACKGROUND OF THE INVENTION

1. Field of the Invention

The present invention relates generally to a method of detecting the alignment error of lenses and reducing image distortion attributable to the alignment error in a lens-type 3-dimensional liquid crystal display monitor.

2. Description of the Related Art

Figure 1:
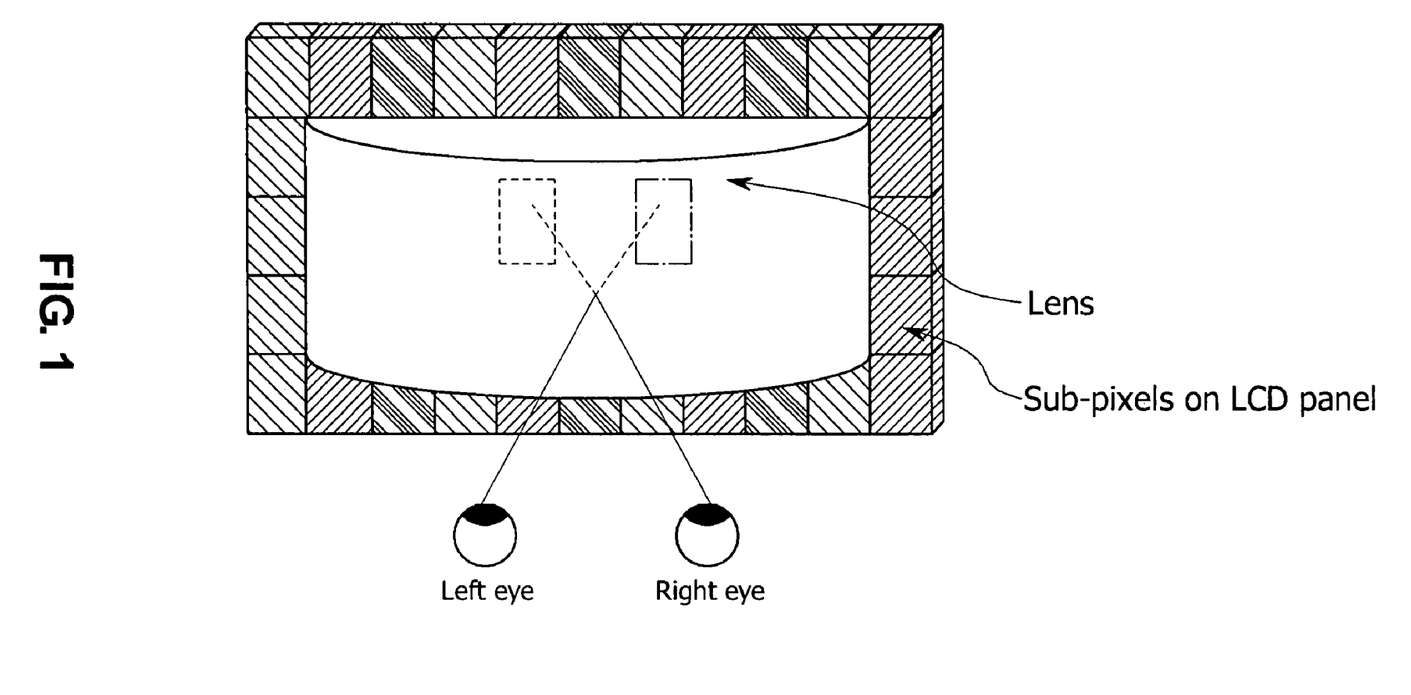
FIG. 1 is a diagram illustrating a conventional lens-type lenticular display scheme.

As shown in FIG. 1, a lenticular display, that is, a lens-type 3-dimensional (3D) monitor, refracts light from the pixels of a Liquid Crystal Display (LCD) panel using lenses. As a result, a phenomenon in which different pixels are viewed depending on the location of the eye of a viewer occurs. Accordingly, images entering through the right eye and left eye are different from each other. Since humans 3-dimensionally perceive an object based on the binocular disparity between images entering through the left eye and the right eye, it is possible to cause humans to perceive 3D objects using such display devices.

Figure 2:
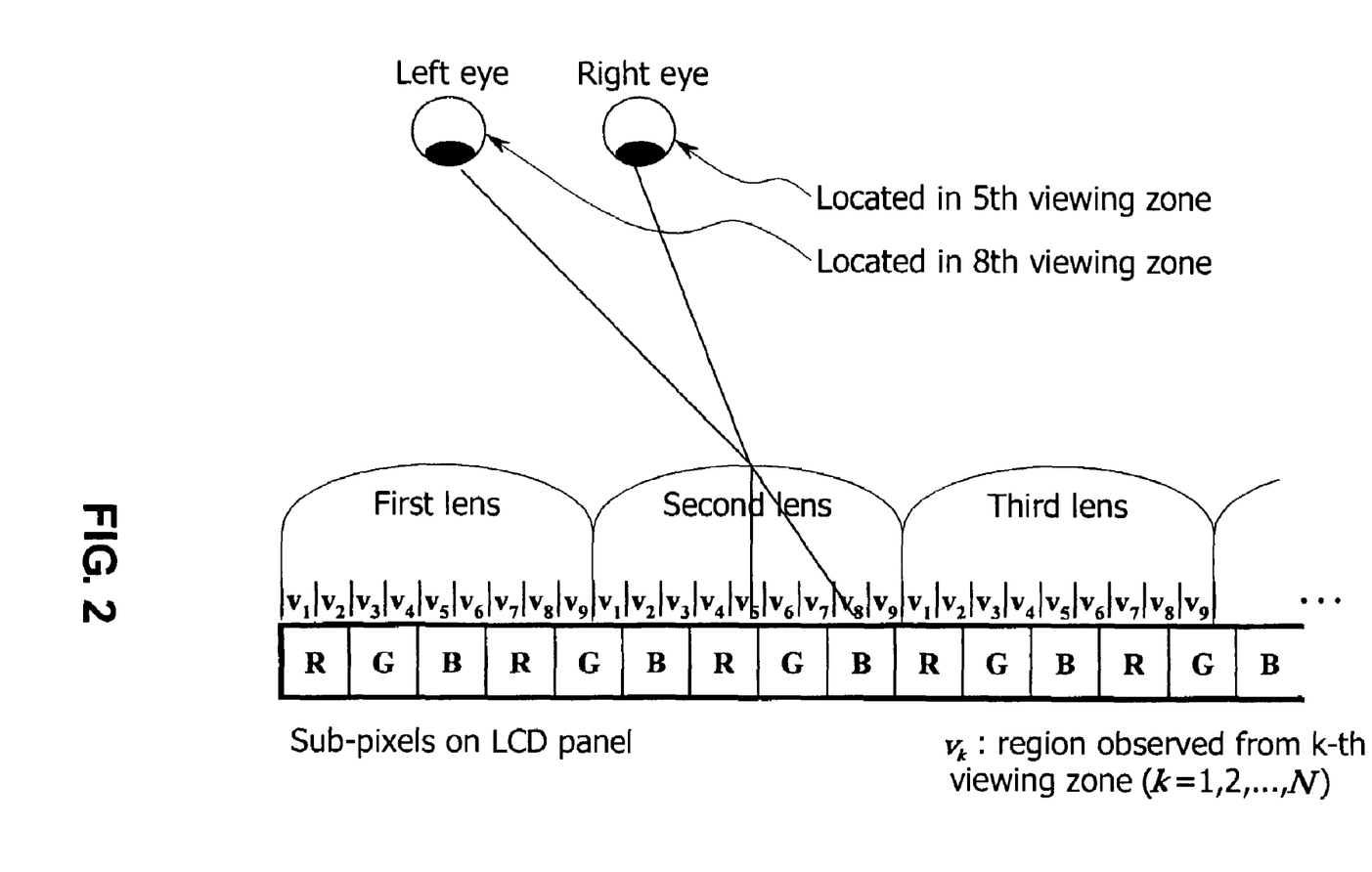
FIG. 2 is a diagram illustrating the operational principle of the conventional lenticular display scheme.

FIG. 2 is a transverse section of FIG. 1. Since the left eye views the region of an eighth viewing zone and the right eye views the region of a fifth viewing zone, the two eyes observe different pixel values. As illustrated in FIG. 2, the end point of the line of sight of the eye is located in one of 1 to N viewing zones, so that N different images may be observed depending on the location of the eye. This system is referred to as an "N view lenticular display system."

The lenticular display system may be manufactured by attaching cylinder-shaped lenses to an LCD panel (see FIG. 1). Meanwhile, since resolutions in the lateral and vertical directions of an observed 3D image are significantly different, a slanted lenticular display, in which cylinder-shaped lenses are attached to an LCD panel in a slanted position, has been developed.

Figure 3:
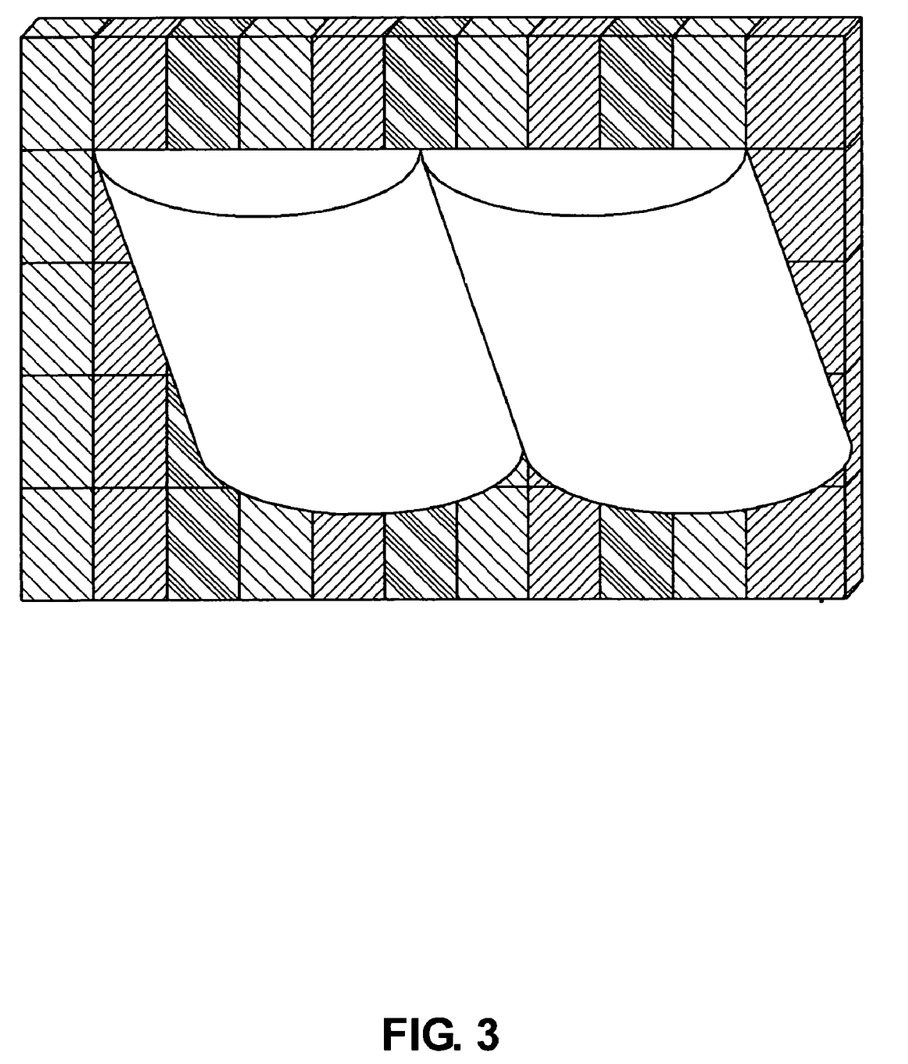
FIG. 3 is a diagram illustrating a conventional slanted lens-type lenticular display scheme.

The lateral distance of respective sub-pixels in R, G and B pixels on an LCD panel is very small (equal to or smaller than about 0.1 mm). Meanwhile, since the cylinder-shaped lenses must be accurately aligned and attached to an LCD panel, as shown in FIG. 3, high precision is required. Accordingly, it is very difficult to attach the cylinder-shaped lenses to the LCD panel, so that it is also difficult to avoid alignment error. However, since the occurrence of even minute alignment error causes image distortion, such alignment error causes the problem of degrading the image quality of a lenticular display device.

SUMMARY OF THE INVENTION

In order to overcome the above-described problems caused by alignment error, a process of precisely predicting the alignment error is required. Accordingly, an object of the present invention is to provide a method of precisely predicting alignment error.

Meanwhile, since the alignment error is not intentional error, reduction in error is not ensured even if the alignment error is known and lenses are correctly attached again to an LCD panel. That is, it is difficult to respectively and accurately align lenses in each display device using a hardware approach.

Accordingly, the object of the present invention is to provide an algorithm for compensating for image distortion attributable to predicted alignment error using a software approach based on a signal processing technique.

In order to accomplish the above object, the present invention provides a method of detecting the alignment error of lenses in a 3D display using a purpose-built test pattern image, which predicts the alignment error in such a way as to calculate variation in view indices of pixels in a lateral direction that is observed by an eye of an observer, if there is alignment error in the lenses.

Additionally, the present invention provides a method of compensating for image distortion in a 3D monitor, including the steps of finding the relationship between the pixels of a Liquid Crystal Display (LDC) panel and the pixels of observed images, which are determined depending on the location of an observer; and compensating for image distortion attributable to the rotational and translational alignment error of the lenses based on the found relationship.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Preferred embodiments of the present invention are described in detail with reference to the accompanying drawings.

The alignment error in the present invention includes rotational error and translational error.

Figure 4:
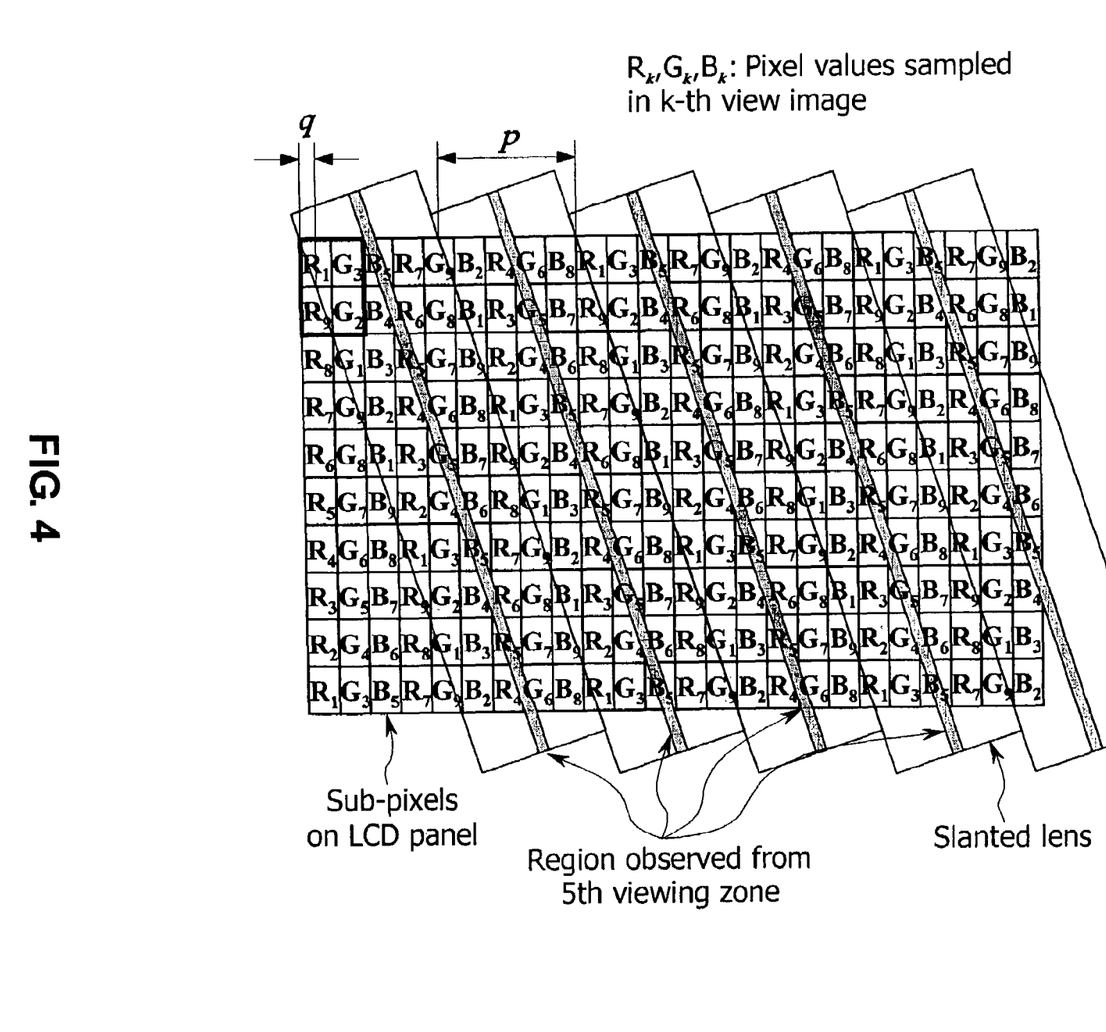
FIG. 4 is a diagram illustrating the case where lenses are accurately arranged.
Figure 5:
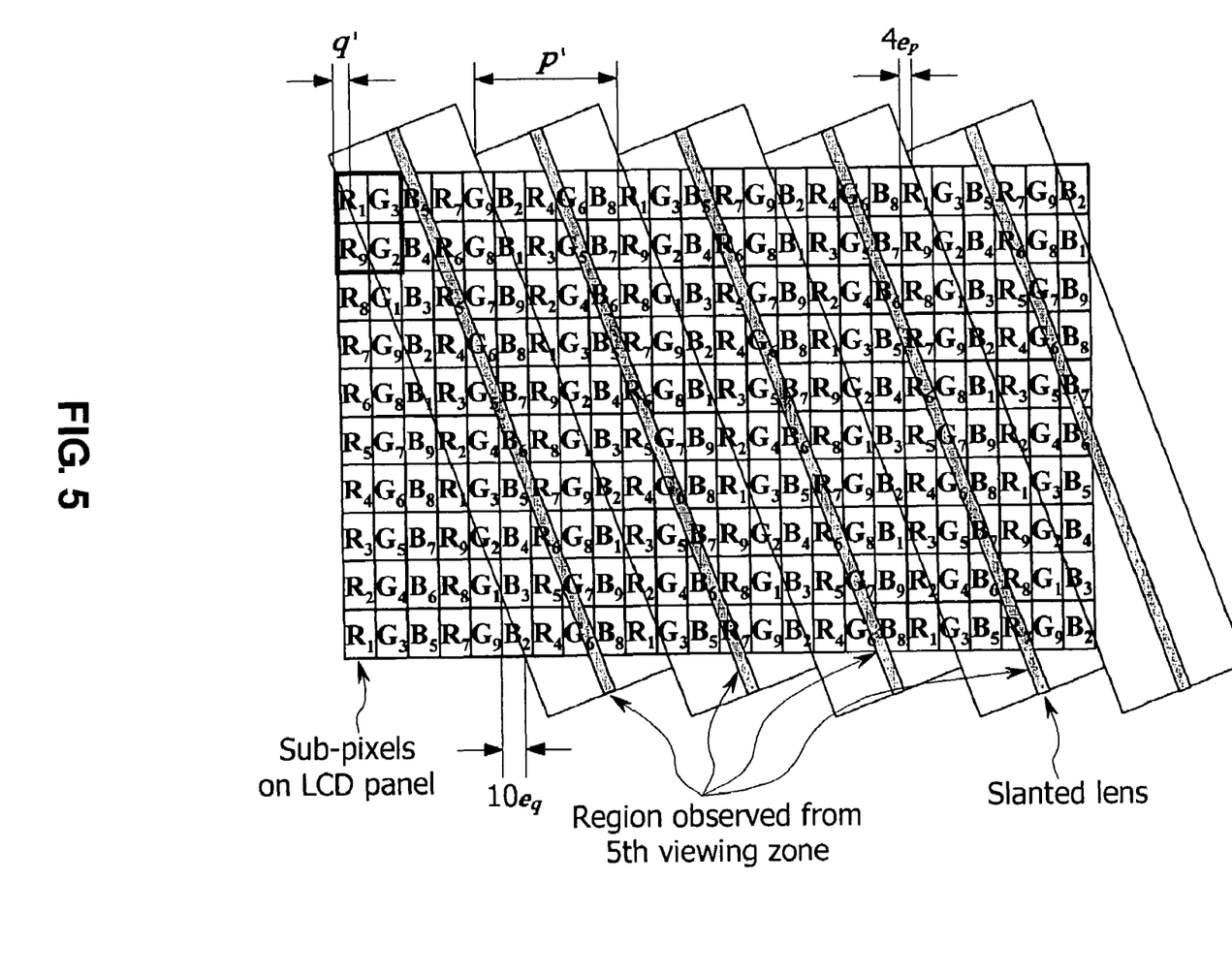
FIG. 5 is a diagram illustrating the case where lenses are not accurately arranged, so that rotational error exists.

First, prediction of the rotational error is described. As shown in FIG. 4, the pitch of correctly aligned lenses and the lateral movement of the lenses between two continuous rows are respectively set to p and q. In the case of FIG. 5 where alignment error exists, p and q are changed to p' and q', respectively.

In that case, the error $e_p$ in pitch is expressed by the following Equation 1:

$$p' = p + e_p \qquad (1)$$

In the case where alignment error exists as illustrated in FIG. 5, the image index (view number) of a pixel observed by the eye of an observer increases or decreases in the lateral direction. If the value of $e_p$ is positive, the image index increases. If $e_p$ is negative, the image index decreases. Since the value of $e_p$ is accumulated in the lateral direction as shown in FIG. 5, the error $e_{p,i}$ of an i-th lens is defined as the following Equation:

$$e_{p,i} = i \times e_p \quad (2)$$

Accordingly, the overall error value on the LCD panel is as follows:

$$e_{p,N_L} = N_L \times e_p \quad (3)$$

where $N_L$ is the total number of lenses in the lateral direction. If the resolution of the LCD panel is $N_W \times N_H$, the value of $N_L$ is $3N_W/p'$. The above-described equations are satisfied when the distance between the observer and the LCD panel is significantly greater than the width of the LCD panel. Accordingly, the value of $e_{p,N_L}$ can be calculated by observing an image synthesized for that purpose from a sufficiently long distance.

The image used to measure $e_{P,N_L}$ may be formed in various shapes. For ease of prediction, in FIG. 5, only the values of $R_1$, $G_2$, $B_3$, $R_4$, $G_5$, $B_6$, $R_7$, $G_8$ and $B_9$ are set to 255, and the values of the remaining pixels are set to 0. If the image formed as described above is observed through a display device having no alignment error, the images must be viewed in red, green, blue, red, . . . , blue from 1, 2, 3, . . . , 9 viewing zones.

However, in the case where alignment error exists, various colors appear in the interior of images observed from respective viewing zones. Accordingly, the alignment error of lenses can be calculated by calculating the variation. If the variation in color has the sequence of red, green and blue in the lateral direction, the value of $e_p$ is positive. However, in the sequence is reversed, the value is negative. Furthermore, the absolute of $e_p$ can be calculated using the following Equation. In this Equation, $e_{p,N_1}$ is the number of view changes in the lateral direction of observed images, and can be obtained using the following Equation.

$$|e_p| = \frac{|e_{p,N_L}|}{N_L} = \frac{p'|e_{p,N_L}|}{3N_w} = \frac{(p+e_p)|e_{p,N_L}|}{3N_W} \approx \frac{p|e_{p,N_L}|}{3N_W} \quad (4)$$

In the same manner, $e_q$, that is, q, can be obtained using the same method. $e_q$ can be calculated using the number of view changes ($e_{q,N_H}$) in a vertical direction and the following Equation.

$$|e_q| = \frac{|e_{p,N_H}|}{N_H} \quad (5)$$

Figure 6:
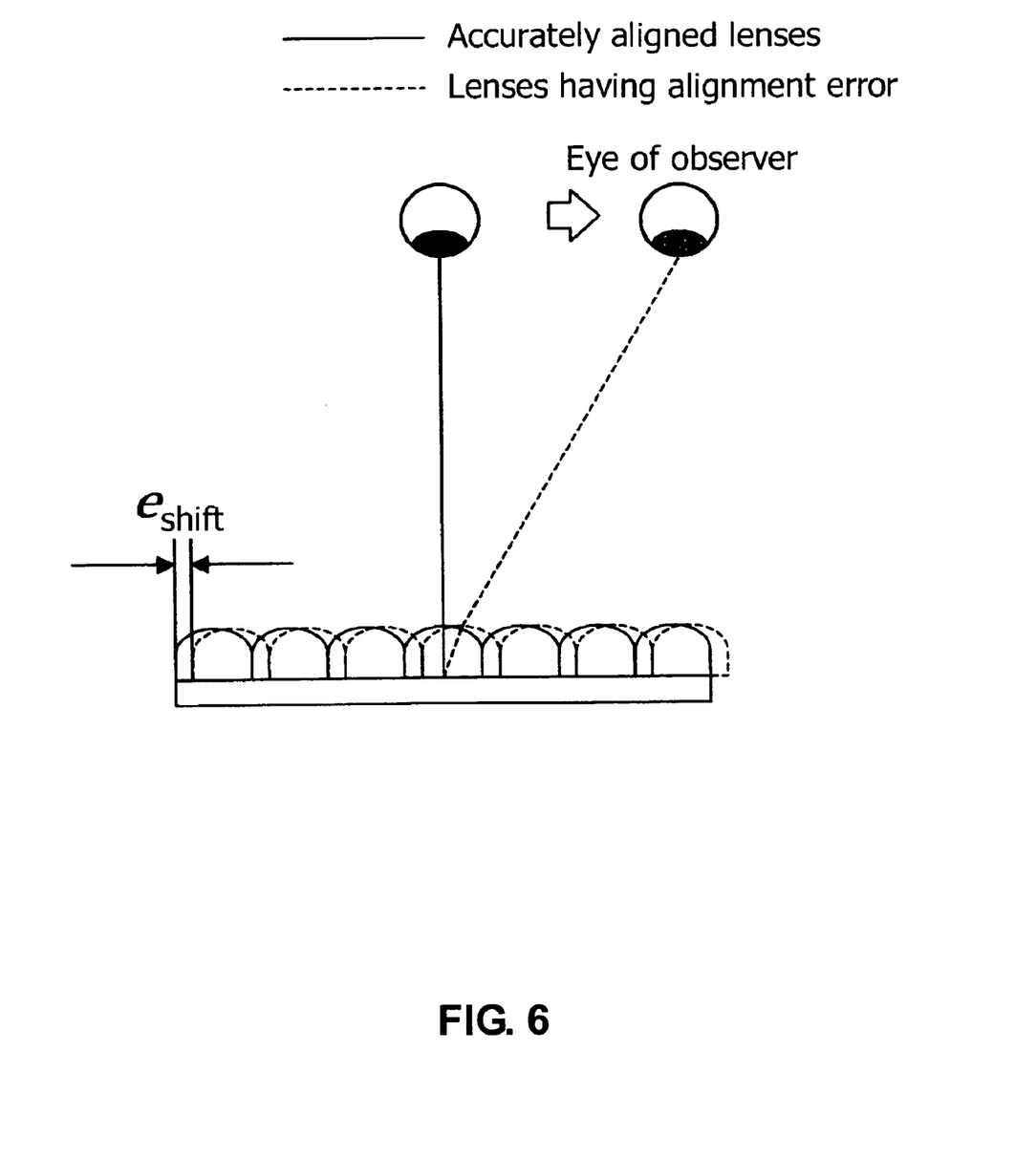
FIG. 6 is a diagram illustrating the case where lenses have alignment error in a lateral direction.

The translational error is represented by $e_{shift}$, as shown in FIG. 6. In order to predict this value, an image is simply formed as follows. The values of pixels corresponding to a central viewing zone are set to 255, and the remaining values are set to 0. If there is no translational error, a white image is observed from the central viewing zone. However, if there is a translational error, a viewing zone from which a white color can be observed moves. Accordingly, if the amount of movement is $N_{shift}$, $e_{shift}$ is expressed by the following Equation:

$$e_{shift} = \frac{p' \times N_{shift}}{N_H} \quad (6)$$

Figure 7:
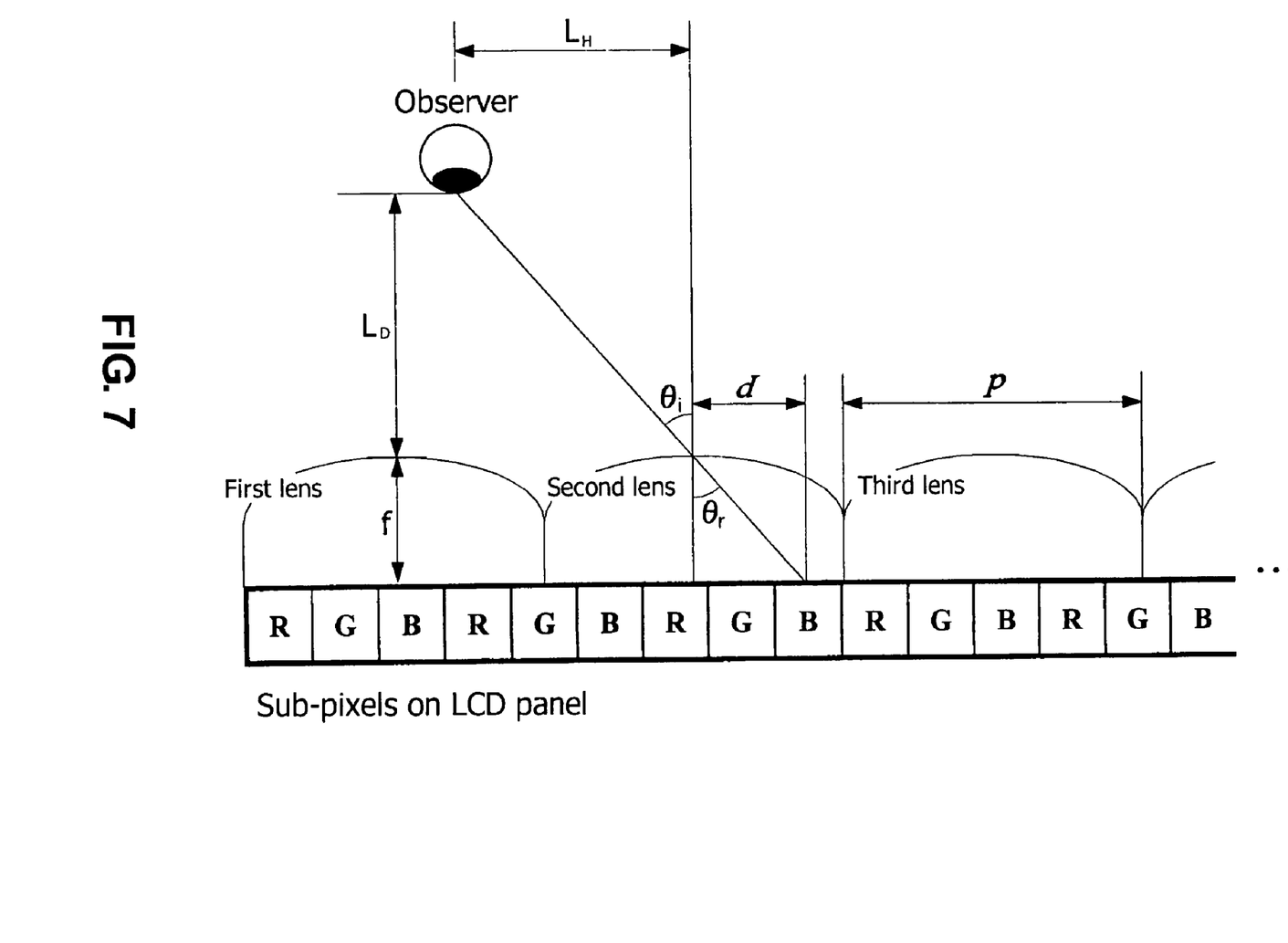
FIG. 7 is a diagram illustrating the location from which the eye of an observer observes an LCD panel.

In that case, the rotational error must be corrected before the measurement of the translational error. That is, after the image distortion has been corrected, the translational error must be measured. In order to compensate for the image using the predicted rotational error and translational error, the relationship between observed pixels on an LCD panel depending on the location of an observer must be known. FIG. 7 represents this relationship. In FIG. 7, according to Snell's law, $$\sin \theta_i = n_r \sin \theta_r \quad (7)$$

where $n_r$ is the refractive index of a lens, and $\theta_i$ and $\theta_r$ are the incident angle and refracted angle of the lens. Furthermore, from FIG. 7, $$\sin \theta_i = \frac{L_H}{\sqrt{L_D^2 + L_H^2}} \quad (8)$$

$$\sin \theta_r = \frac{d}{\sqrt{f^2 + d^2}} \quad (9)$$

Of the distance between an observer and an LCD display, a lateral distance is $L_H$ and a vertical distance is $L_D$. Furthermore, f is the focal distance of a lens.

The following Equation is obtained from Equations 7, 8 and 9.

$$d = f \frac{L_H}{\sqrt{n_r^2(L_D^2 + L_H^2) - L_H^2}} \quad (10)$$

Figure 8:
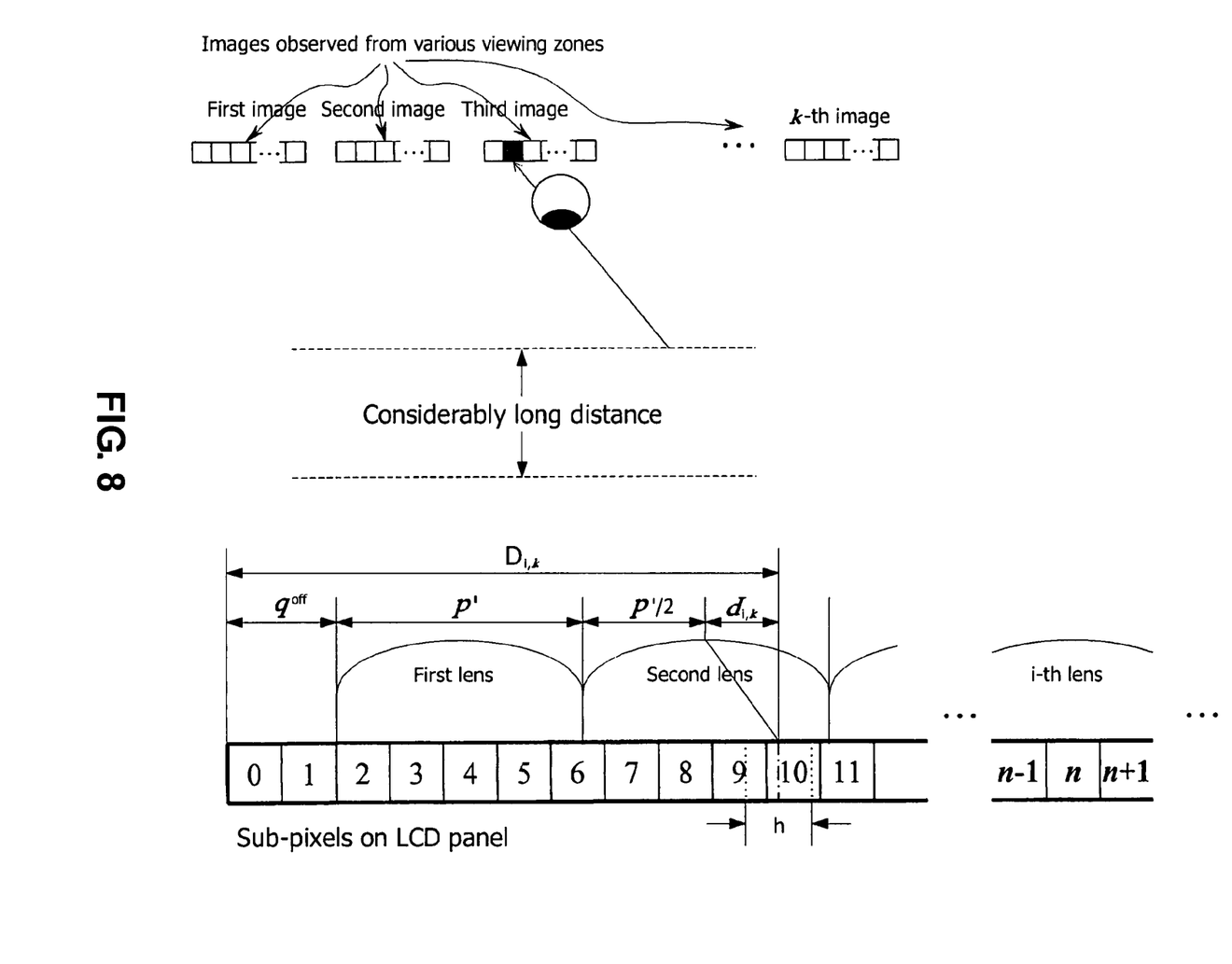
FIG. 8 is a diagram illustrating the relationship between the eye of an observer and the sub-pixels of an LCD panel.

Now, as illustrated in FIG. 8, the j-th row in the LCD pixels is considered below. Since the index j is attached to all of the terms in the following Equation, the index j is omitted for convenience. As illustrated in FIG. 8, when $q_{off}$ is the distance from the leftmost side of an LCD panel to the left edge of the first lens of the LCD panel, $q_{off}$ is expressed by the following Equation.

$$q_{off} = (e_{shift} + j \times q') - \left\lfloor \frac{(e_{shift} + j \times q')}{p'} \right\rfloor \times p' \quad (11)$$

where $\lfloor x \rfloor$ denotes the greatest integer less than or equal to x. $D_{i,k}$ is the distance to the center of a region that is observed at the i-th lens of the k-th viewing zone from the left edge of an LCD panel.

$$D_{i,k} = q_{off} + (i-0.5) \times p' + d_{i,k} \quad (12)$$

Furthermore, $d_{i,k}$ is d when the i-th lens of the k-th viewing zone obtained from Equation 10 is observed. Then, a region observed by an observer is $\lfloor D_{i,k} - h/2, D_{i,k} + h/2 \rfloor$, and the value of brightness of the i-th lens that is observed from the k-th viewing zone is expressed by the following Equation:

$$\bar{p}_{i,k} = (\bar{p}_{i,k}^R, \bar{p}_{i,k}^G, \bar{p}_{i,k}^B) = \sum_{n=D_{i,k}^-}^{D_{i,k}^+} w_{n,i,k} \, p_{LCD}(n) \quad (13)$$

where $W_{n,i,k}$ is the contribution of the n-th pixel of an LCD panel to a brightness value observed from the i-th lens. $D_{i,k}^-$ and $D_{i,k}^+$ are $\lfloor D_{i,k} - h/2 \rfloor$ and $\lfloor D_{i,k} + h/2 \rfloor$, respectively. Further, the value of $P_{LCD}(n)$ is the value of the n-th pixel on an LCD panel, and is expressed by the following Equation:

$$P_{LCD}(n) = \begin{cases} (P_{LCD,n}, 0, 0) & \text{if } n = 0 (\text{mod } 3) \\ (0, P_{LCD}, 0) & \text{if } n = 1 (\text{mod } 3) \\ (0, 0, p_{LCD,n}) & \text{if } n = 2 (\text{mod } 3) \end{cases} \quad (14)$$

That is, $P_{LCD}(n)$ represents one of red, green and blue components. $W_{n,i,k}$ is expressed by the following Equation:

$$w_{i,n,k} = \begin{cases} \dfrac{D^-_{i,k} + 1 - (D_{i,k} - h/2)}{h} & \text{if } D^-_{i,k} \neq D^+_{i,k} \text{ and } n = D^-_{i,k} \\ \dfrac{(D_{i,k} + h/2) - D^+_{i,k}}{h} & \text{if } D^-_{i,k} \neq D^+_{i,k} \text{ and } n = D^+_{i,k}, \\ \dfrac{1}{h} & \text{if } D^-_{i,k} \neq D^+_{i,k} \text{ and } D^-_{i,k} < n < D^+_{i,k}, \\ 1 & \text{if } D^-_{i,k} \neq D^+_{i,k} = n, \\ 0 & \text{otherwise} \end{cases} \quad (15)$$

The relationship between the values of pixels on an LCD panel and the values of observed brightness is expressed by Equation 13. Accordingly, since the values of brightness desired to be actually observed is known, image distortion can be defined by the following Equation:

$$e(n) = \begin{cases} \sum_{(i,k) \in W_n} w^2_{n,i,k}(P^R_{i,k} - p_{LCD}(n))^2 & \text{if } n \equiv 0 (\text{mod } 3) \\ \sum_{(i,k) \in W_n} w^2_{n,i,k}(p^G_{i,k} - P_{LCD}(n))^2 & \text{if } n \equiv 1 (\text{mod } 3) \\ \sum_{(i,k) \in W_n} w^2_{n,i,k}(p^B_{i,k} - p_{LCD}(n))^2 & \text{if } n \equiv 2 (\text{mod } 3) \end{cases} \quad (16)$$

where $W_n = \{w_{n,i,k} | w_{n,i,k} \neq 0 \text{ for } \forall(i,k)\}$.

Accordingly, in order to reduce image distortion, the value of $e(n)$ is reduced. The solution that satisfies this is expressed by the following Equation:

$$P_{LCD,n} = \begin{cases} \dfrac{\sum_{(i,k) \in W_n} w^2_{n,i,k} P^R_{i,k}}{\sum_{(i,k) \in W_n} w^2_{n,i,k}} & \text{if } n \equiv 0 (\text{mod } 3) \\ \dfrac{\sum_{(i,k) \in W_n} w^2_{n,i,k} P^G_{i,k}}{\sum_{(i,k) \in W_n} w^2_{n,i,k}} & \text{if } n \equiv 1 (\text{mod } 3) \\ \dfrac{\sum_{(i,k) \in W_n} w^w_{n,i,k} P^B_{i,k}}{\sum_{(i,k) \in W_n} w^2_{n,i,k}} & \text{if } n \equiv 2 (\text{mod } 3) \end{cases} \quad (17)$$

When the image is compensated for using Equation 17, the image distortion attributable to the above-described rotational error and the above-described translational error can be reduced.

The use of the above-described alignment error detection method and compensation method in a lens-type 3D monitor according to the present invention has the following advantages.

First, by precisely detecting alignment error, the defects of products can be precisely detected and the lenses can be precisely attached at the time of manufacturing display devices.

Second, for minute alignment error that is difficult to physically correct, the image distortion can be reduced using the invented method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting alignment error of lenses comprising the steps of:
   a computer displaying a predefined test image on a three-dimensional (3D) monitor; and
   the computer calculating variation in image index of a pixel in a lateral direction which is observed from the test image displayed on the 3D monitor.

2. The method as set forth in claim 1, wherein, if there is alignment error of the lenses, a plurality of colors are displayed in an interior of images that are observed from respective viewing zones.

3. A method of compensating for image distortion, comprising the steps of:
   a computer detecting original error of an image by displaying a predefined test image on a 3D monitor and calculating variation in image index of a pixel in a lateral direction which is observed;
   the computer detecting translational error of the image by displaying a purpose-formed test image on the 3D monitor;
   the computer detecting relationship between pixels of a Liquid Crystal Display (LCD) panel depending on an observational location of the 3D monitor; and
   the computer compensating for distortion of the image attributable to the alignment error of the lenses using values of the rotational error, the translational error and the values and the relationship between the pixels of the LCD Panel depending on the observational location of the 3D monitor.

4. The method as set forth in claim 3, wherein a distance d of the lenses is calculated using refraction of light depending on the observational location at the step of the compensation for the distortion of the image.

5. The method as set forth in claim 3, wherein a value of the image observed at the step of compensating for the distortion of the image is represented using sub-pixel values P on the LCD panel.

* * * * *